United States Patent [19]

Kobayashi et al.

[11] Patent Number: 4,623,998

[45] Date of Patent: Nov. 18, 1986

[54] COMMUNICATION NETWORK HAVING GAIN ADJUSTMENT FUNCTION OF A TRANSMISSION AMPLIFIER OF MEDIUM ATTACHMENT UNIT

[75] Inventors: Hiroshi Kobayashi, Tokyo; Hideaki Haruyama, Yokohama; Tsuguhiro Hirose, Tokyo, all of Japan

[73] Assignee: Kabushiki Kaisha Toshiba, Kawasaki, Japan

[21] Appl. No.: 738,252

[22] Filed: May 28, 1985

[30] Foreign Application Priority Data

Jun. 1, 1984 [JP] Japan .................................. 59-112514

[51] Int. Cl.[4] .............................................. H04J 3/08
[52] U.S. Cl. ......................................... 370/85; 370/98
[58] Field of Search ...................... 370/85, 98, 74, 94; 375/98; 455/355, 247, 234, 237

[56] References Cited

U.S. PATENT DOCUMENTS

| 4,251,881 | 2/1981 | Ruether | 370/98 |
| 4,271,503 | 6/1981 | Eumurian et al. | 370/74 |
| 4,281,408 | 7/1981 | Bonneiot | 370/74 |

*Primary Examiner*—Douglas W. Olms
*Attorney, Agent, or Firm*—Oblon, Fisher, Spivak, McClelland & Maier

[57] ABSTRACT

In a communication network in which a plurality of information processors are coupled to a communication medium through medium attachment units (MAUs), a pilot signal generator sends a pilot signal of a reference level to a predetermined point of the communication medium. Each MAU has a gain controller to control the gains of transmission and reception amplifiers. This gain controller adjusts the gain of the reception amplifier when the pilot signal is received in accordance with the reception level thereof and then allows a test signal to be transmitted to the communication medium through the transmission amplifier. The gain of the transmission amplifier is adjusted in accordance with the reception level of this test signal such that the reception level of the test signal becomes equal to the reception level of the pilot signal. Each MAU is provided with a random number data generator and sets the transmission time slot of the test signal in dependence on random number data to prevent simultaneous transmission of test signals from MAUs.

7 Claims, 5 Drawing Figures

RSG: REFERENCE LEVEL SIGNAL
TSG: TEST SIGNAL

COMMUNICATION NETWORK HAVING GAIN ADJUSTMENT FUNCTION OF A TRANSMISSION AMPLIFIER OF MEDIUM ATTACHMENT UNIT

BACKGROUND OF THE INVENTION

The present invention relates to an information transmission system and, more particularly, to a communication network in which information processors are coupled to a common communication medium through MAUs (medium attachment units).

Recently, a fully distributed peer protocol transmission system, namely, CSMA/CD (carrier sense multiple access with collision detection) system has been developed as an advanced bus-shaped network. This system performs baseband transmission of information using a coaxial cable. On one hand, broadband networks are getting most of the attention for efficiently utilizig the coaxial cable.

In a broadband network using an FSK modulation system, it is effective to detect the level of a beat signal which is generated due to a collision for a collision detection system to realize the CSMA/CD system. To effectively detect the collision, it is necessary to adjust the output level of a transmission signal of each MAU so that the level of the transmission signal from each MAU becomes equal at one point of the communication medium, for instance, at a headend at which a transmission path of the communication medium is coupled to a reception path, in other words, so that each MAU can receive signals from all MAUs at an equal level. This level adjustment is accomplished by adjusting the gain of a transmission amplifier of each MAU.

A gain adjustment system of the transmission amplifier of each MAU, which allows an effective detection of a signal collision on a broadband network, is disclosed in a copending U.S. patent application Ser. No. 563,241, entitled "INFORMATION TRANSMISSION SYSTEM WITH MODEMS COUPLED TO A COMMUNICATION MEDIUM" filed Dec. 12, 1983 and assigned to the same assignee as this application. According to one system disclosed in this application, a reference level pilot signal is sent to the headend of the communication medium and the reception level of the pilot signal is detected in each MAU and then the gain of a reception amplifier is adjusted in accordance with this reception level so that the reception level suitable for the receiving process is obtained. Thereafter, each MAU transmits a test signal at each predetermined timing and adjusts the gain of the transmission amplifier such that the reception level of this test signal becomes equal to the reception level of the pilot signal, in other words, such that the level of the test signal becomes, at the headend, equal to the level of the pilot signal.

In the case of such a gain adjustment system, it is required that the test signal transmission timing of the MAUs be different from one another. To this end, each of the MAUs is provided with dip switches to set the transmission timing of the test signal. However, to prevent simultaneous transmission of the test signals from MAUs, it is necessary to control the test signal transmission timings of MAUs over the network. In the case where the number of MAUs on the network increases, the test signal transmission timing of each MAU must be readjusted.

SUMMARY OF THE INVENTION

It is an object of the present invention to provide a communications network in which there is no need to control the transmission timing of a test signal which is transmitted from each medium attachment unit to a communication medium and which is used for the adjustment of the gain of a transmission amplifier.

In a communications network in which a plurality of information processors are coupled to a communication medium through medium attachment units (MAU) and pilot signal providing means is provided for providing a pilot signal having a reference level to a predetermined point on the communnication medium so that the pilot signal may be received by each MAU, each MAU comprises: a reception amplifier to receive a signal from the communication medium; a transmission amplifier to transmit a signal to the communication medium; reception level detecting means, coupled to the reception amplifier, for detecting the reception level of a signal; test signal transmitting means for transmitting a test signal to the communication medium through the transmission amplifier; and gain control means for controlling the gains of the transmission and reception amplifiers in response to the reception level detecting means when the pilot signal and test signal are received by the reception amplifier. The gain control means is arranged to enable the test signal transmitting means to transmit the test signal to the communication medium through the transmission amplifier.

Each MAU is provided with random number data generating means, and the gain control means is arranged to enable the test signal transmitting means to transmit the test signal to the communication medium through the transmission amplifier in a time slot depending on random number data after receiving the pilot signal and to adjust the gain of the transmission amplifier in accordance with the reception level of the test signal received by the reception amplifier.

DESCRIPTION O THE EMBODIMENTS

Figure 1:
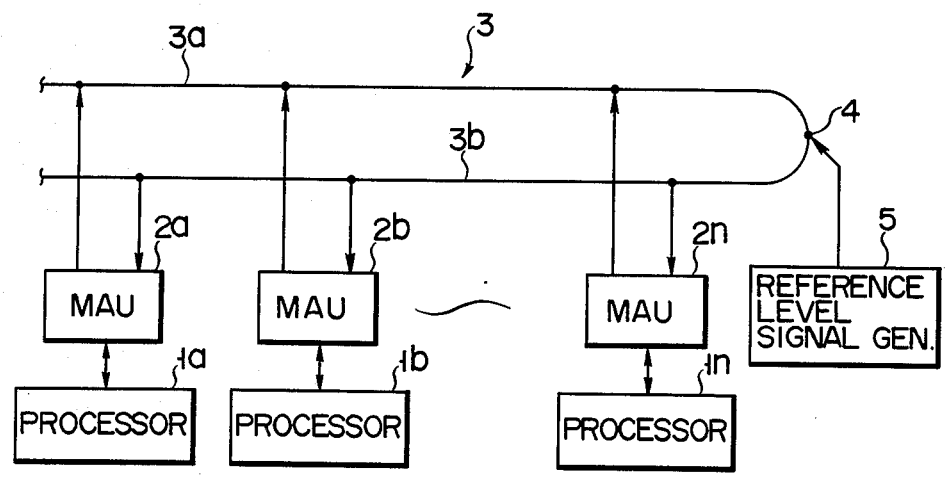
FIG. 1 shows a schematic diagram of a communication network to which the present invention is applied.

Referring to FIG. 1, a plurality of information processors 1a, 1b, . . . , 1n are coupled to arbitrary points on a communication line 3 by means of corresponding medium attachment units (MAU) 2a, 2b, . . . , 2n. The communication line 3 has a transmission path 3a and a reception path 3b and these paths are coupled at a predetermined point on the communication line by means of a headend 4. Output and input lines of each MAU are coupled to the transmission path 3a and the reception path 3b, respectively. Thus, each information processor can receive, through the headend 4 and reception path 3b, information signals transmitted from all information processors to the transmission path 3a. In this embodiment, a reference level signal generator 5 is coupled to the headend 4 to send out an unmodulated signal (pilot signal) RSG having a reference level to the coupling point 4 on the communication line 3 at intervals of a predetermined time. The pilot signal RSG is received by all MAUs.

The term "MAU" is intended to include a modem for use in a broadband network and a transceiver for use in a baseband network. The pilot signal RSG is used so that each information processor may receive information signals from all MAUs at substantially a constant level for an effective detection of a collision using the level detection method, and the transmission quality of information signals may be ensured. This is attained by properly adjusting the gains of reception and transmission amplifiers by use of a reception pilot signal and transmission test signal in each MAU.

Figure 2:
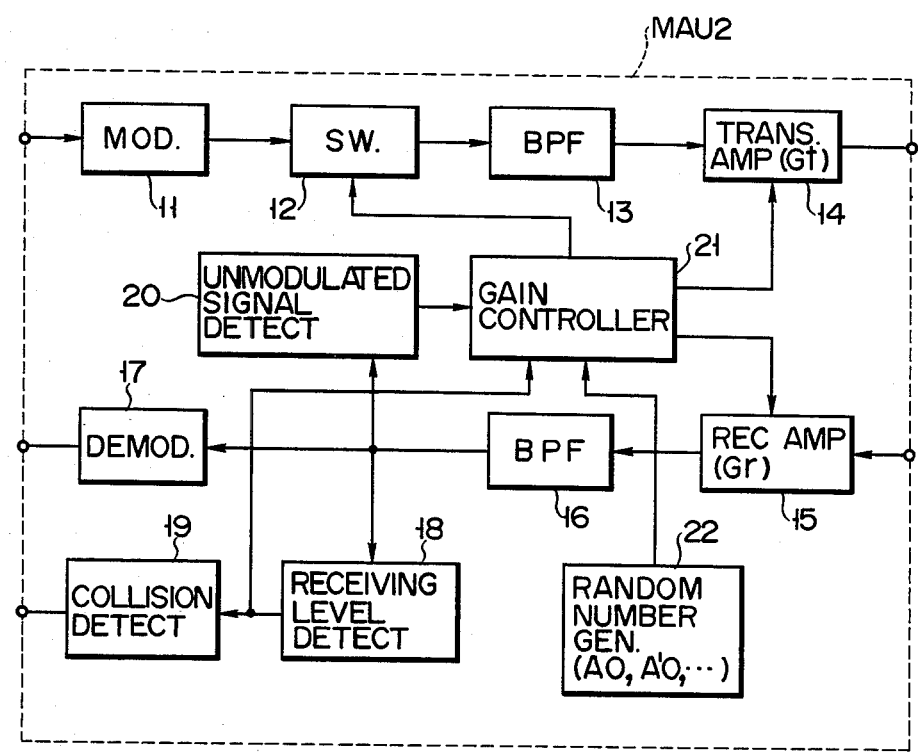
FIG. 2 shows a block diagram of each MAU in the network in FIG. 1.

FIG. 2 schematically shows an arrangement of each MAU 2. Each MAU mainly comprises a data transmitting section, a data receiving section and a collision detecting section.

The data transmitting section comprises a modulator 11 for modulating packet data from the corresponding information processor by a predetermined format such as FSK; an electronic switch 12 for turning on and off an output signal of the modulator in response to a control signal; a bandpass filter (BPF) 13 coupled to an output of the electronic switch; and a transmission amplifier 14 for transmitting an output signal of BPF onto the transmission path 3a of the communication line 3. An unmodulated carrier signal which is used in the modulator 11 is appropriately sent onto the communication line 3 through the transmission amplifier 14 and is used as a test signal TSG to adjust the gain of the transmission amplifier 14. The duration of the test signal TSG is controlled by the electronic switch 12.

The data receiving section comprises a reception amplifier 15 for receiving a transmission signal from the reception path 3b; a BPF 16 for bandpass processing an output signal of the reception amplifier 15; and a demodulator 17 for demodulating an output signal fo BPF 16. The demodulated information signal is supplied to the corresponding information processor. The reception signal is applied to a level detector 18 such as an envelope detector and its reception level is detected. A collision detector 19 for detecting a collision by way of a change in the level of a beat signal caused by the collision is coupled to the level detector 18. Upon occurrence of the collision, the collision detector 19 generates a collision indication signal, thereby informing the corresponding information processor of the occurrence of the collision. Thus the information processor inhibits the transmission of an information signal.

A detector 20 for detecting the unmodulated signal, the frequency band of which is within the passband of BPF 16, which is received by the reception amplifier 15 is connected to the output side of BPF 16. The detector 20 discriminates the unmodulated signal from information signals in dependence on whether a signal whose frequency band falls within the passband of BPF and which is received by the reception amplifier 15 is modulated or not and distinguishes between the pilot signal and the test signal on the basis of the duration of a reception signal. An output of the detector 20 is coupled to a gain controller 21. The output of the level detector 18 is also coupled to the gain controller 21. The gain controller 21 may be realized by a microprocessor.

As wil be mentioned later, when a pilot signal is received, the gain controller 21 controls the gain of the reception amplifier 15 in accordance with the reception level information of the pilot signal from the level detector 18 such that the reception level suitable for the receiving process is obtained. The gain controller 21 enables the electronic switch 12 at the proper timing after the pilot signal RSG is received, thereby allowing the test signal TSG to be transmitted onto the transmission path 3a through the transmission amplifier 14. This test signal TSG is received by the reception amplifier 15 of the same MAU. The gain controller 21 controls the gain of the transmission amplifier 14 such that the reception level of the test signal becomes equal to the reception level of the pilot signal.

According to the invention, a random number data generator 22 is provided for each MAU in order to prevent the simultaneous transmission of test signals from MAUs 2. For instance, this random number data generator generates data representative of a plurality of random numbers after a power supply of the corresponding MAU is turned on and then these data are timely entered into the gain controller 21. As will be described in detail later, the use of random number data allows time slots for transmission of test signals which are assigned to MAUs to be effectively dispersed, thereby effectively preventing the collision of test signals.

Figure 3:
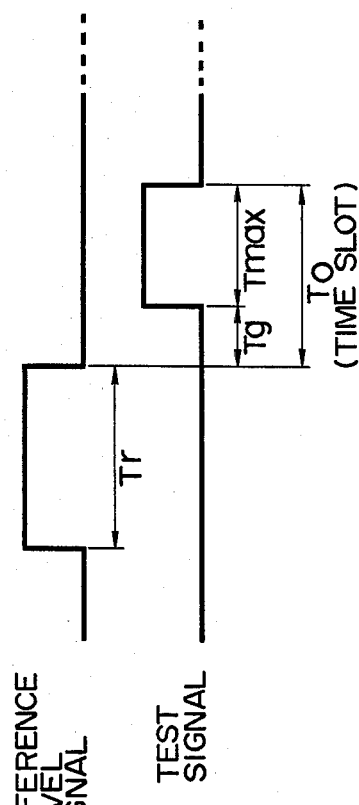
FIG. 3 shows the relation between a pilot signal and a time slot in which a test signal is transmitted.

FIG. 3 shows the relation between the duration of pilot signal RSG and the time slot for transmission of the test signal TSG. In this embodiment, the pilot signal RSG has a duration of 5 msec, enough to adjust the gain of the reception amplifier, and is transmitted at intervals of five seconds. In this case, after each pilot signal is turned off, the time slots for transmission of test signals continue. Each of MAUs is allotted time slots according to the random number data generated therein. The duration $T_0$ of each time slot is set to 4 msec. A guard time of $T_g$ is set at the beginning of a time slot. $T_g$ is determined in consideration of conditions of maximum delay time of the network, oscillation error of a quartz oscillator and the like. In this embodiment, $T_g$ is set to 1 msec. $T_g$ serves to provide a time allowance for each MAU to check whether or not test signals are transmitted from other MAUs when a time slot allotted to that MAU arrives. The duration $T_{max}$ of the test signal is set to 3 msec which is enough for adjustment of the gain of the transmission amplifier.

Figure 4:
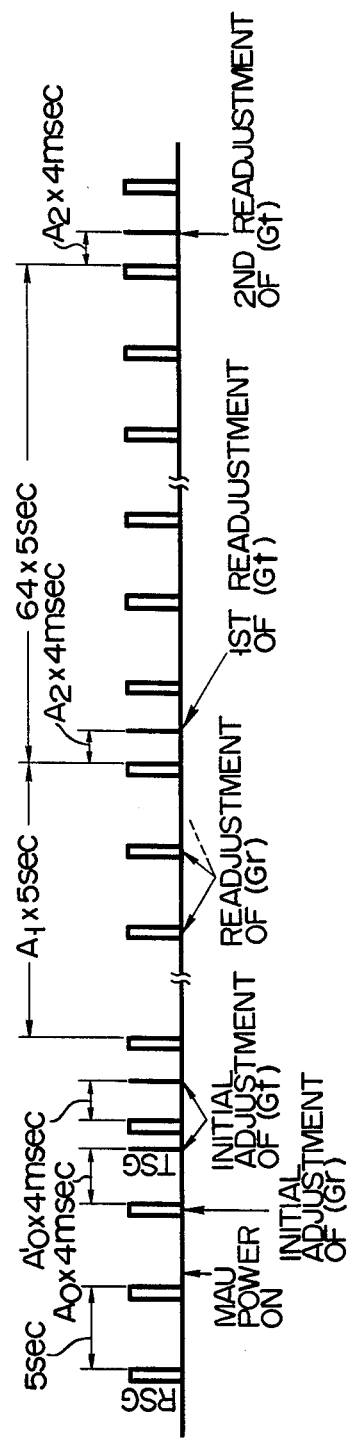
FIG. 4 shows a time chart for explaining the gain control operation according to the invention.
Figure 5:
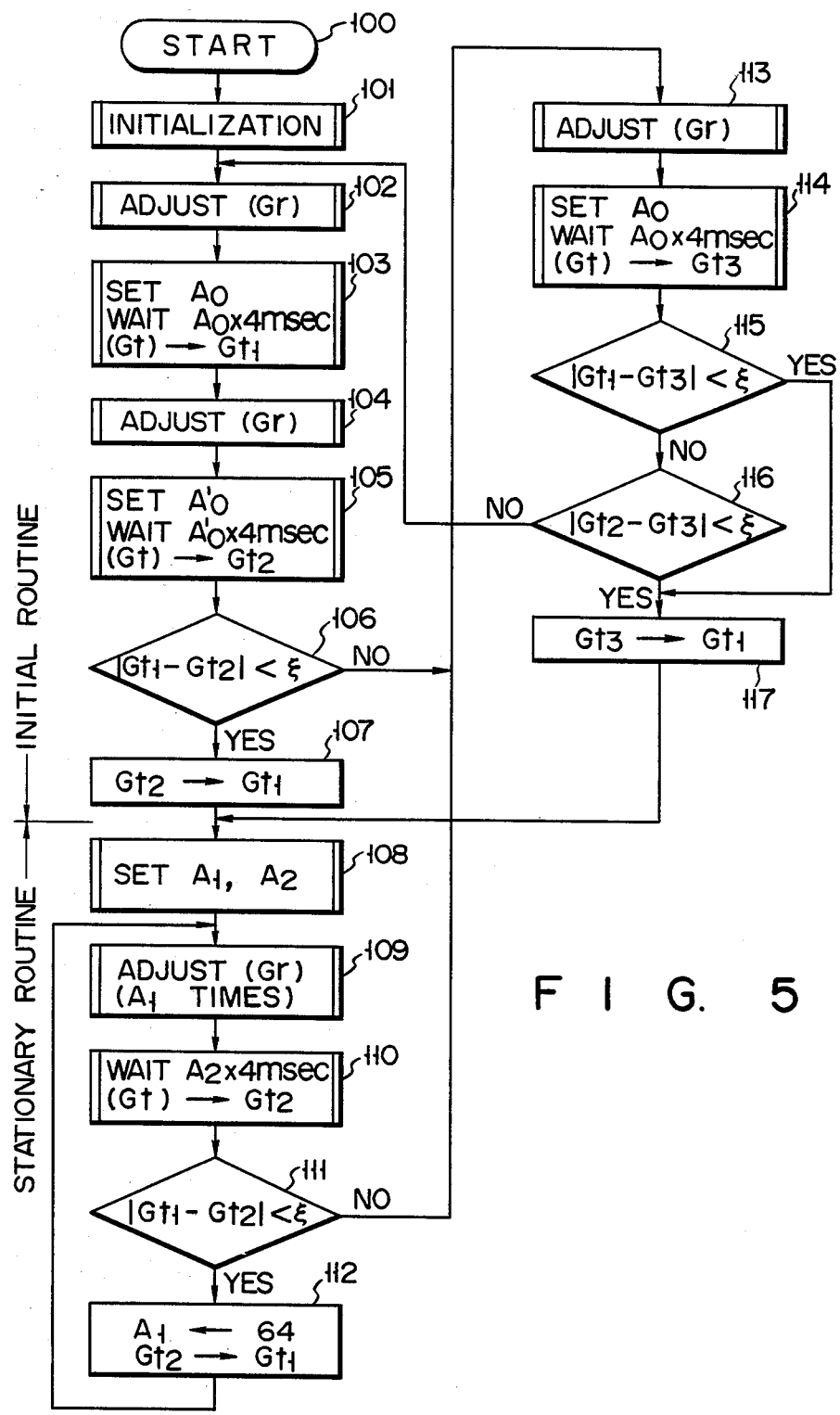
FIG. 5 shows a flow chart for explaining the gain control operation according to the invention.

The gain adjustment procedure of the reception and transmission amplifiers of each MAU will now be described hereinbelow with reference to FIGS. 4 and 5. FIG. 4 shows a time chart for the gain adjustment operation and FIG. 5 shows a flowchart for the gain adjustment operation. The gain adjustment operation includes an intitial routine and a stationary routine.

The gain adjustment operation of each MAU is started by turning on power supply (block 100). Due to the turn-on of power supply, the random number generator 22 generates a plurality of random numbers as mentioned above and these numbers are appropriately used by the gain controller 21. After the turn-on of power supply, an initialization operation is performed (block 101). Due to the initialization operation the gain of receiving amplifier 15 is maximized so that a very small signal may be correctly received. The pilot signal RSG has been sent onto the communication line 3 by the reference signal generator 5. When a first pilot signal is received after the power supply is turned on, the gain controller 21 adjusts the gain $G_r$ of the reception amplifier 15 in accordance with the reception level of the pilot signal such that a reception level suitable for signal processing is obtained (block 102). When the first pilot signal RSG is received, the gain controller 21 fetches a random number $A_0$ from the random number generator 22 to set a timing at which a first test signal TSG is to be transmitted. After the first pilot signal RSG is received, the gain controller 21 stands by for a time up to the $A_0$th time slot in one period of the pilot signal and then enables the electronic switch 12 for a period of $T_{max}$ in the next $(A_0+1)$th time slot after the guard time $T_g$, thereby alllowing the test (carrier) signal TSG to be transmitted onto the transmission path 3a through the transmission amplifier 14. The test signal TSG is received through the transmission path 3a, headend 4 and reception path 3b by the reception amplifier 15 of the same MAU. The gain controller 21 adjusts the gain $G_t$ of the transmission amplifier 14 such that the reception level of this test signal becomes substantially equal to the reception level of the pilot signal (block 103). This first adjusted gain is $G_{t1}$. When the next pilot signal RSG is received, the gain controller 21 readjusts the gain $G_r$ of the reception amplifier 15 (block 104).

When the second pilot signal is received, the gain controller 21 fetches another random number $A'_0$ from the random number generator 22 and sets a new time slot for transmission of test signal TSG. As in the above case, the test signal TSG is transmitted in the $(A'_0+1)$th time slot ater the second pilot signal has been received and the gain $G_t$ of the transmission amplifier 14 is adjusted in accordance with the reception level of this test signal (block 104). The second adjusted gain is $G_{t2}$. Next, the difference between the first and second adjusted values $G_{t1}$ and $G_{t2}$ is decided (decision block 106). When the difference is smaller than an allowable error range $\epsilon$, the second adjusted value $G_{t2}$ of the transmission amplifier 14 is set to the first adjusted value $G_{t1}$ (block 107). Thus, the initialization routine is finished and the gain control operation advances to the stationary routine.

In the initialization routine, for instance, in a case where the power supplies of MAUs are simultaneously turned on, there is such a tendency that transmission time slots of test signals which are allocated to MAUs are concentrated within a short period. The stationary routine intends to distribute widely the time slots which are assigned to MAUs and to prevent the gains of the amplifiers from varying due to changes with time in parameters of communications network and MAUs.

In the stationary routine, the gain control of the reception amplifier is executed every time a pilot signal is received. A pilot signal RSG, which serves as a reference for determining a time slot in which a test signal TSG should be transmitted, is selected on the basis of random numbers $A_1$ and $A_2$ generated by the random number data generator 22 (block 108). More specifically, a pilot signal RSG, which is received $(A_1 \times 5)$ seconds later from the second pilot signal, is selected and a test signal is transmitted in the $(A_2+1)$th time slot in one period of the pilot signal subsequent to that pilot signal RSG. As many as $A_1$ pilot signals are received until this test signal is received and the gain of the reception amplifier 15 is controlled whenever each of the pilot signals is receeived (block 109). After the selected pilot signal is received as described above, the gain controller 21 stands by for $(A_2 \times 4)$ msec and then transmits the test signal TSG in the time slot assigned as described above to control the gain $G_t$ of the transmission amplifier 14 in a similar manner as in the initialization routine (block 110). The adjusted gain value is $G_{t2}$.

The difference between the gain value $G_{t1}$ of the transmission amplifier set in the initialization routine and the first gain value $G_{t2}$ set in the stationary routine is decided (decision block 111). When this difference is smaller than the value $\epsilon$, it is considered that the transmitted test signal TSG has not collided with another signal on the communication line. When the difference is larger than $\epsilon$, it is regarded that a signal collision has occurred, so that the processing routine advances to a process in block 113 which will be explained later.

When the above-mentioned difference is small, the stationary routine is maintained. In the subsequent operations, the time slot which is assigned to each MAU is fixed, the test signal is transmitted at the time that is determined by this time slot and the gain of the transmission amplifier is controlled.

Therefore, the random number $A_1$ is fixed to, e.g., 64. Namely, pilot signals received at an interval of $64 \times 5$ seconds from the pilot signal RSG previously selected by $A_1$ are used as a reference signal for the second and subsequent control operations in the stationary routine. As a result, the dispersed state of time slots which are assigned to MAUs is maintained. The adjusted gain $G_{t2}$ of the transmission amplifier in the stationary routine is replaced by the adjusted gain $G_{t1}$ in the initialization routine (block 112). Thereafter, the operation returns to block 109 and unless variations occur in the system, the gain of the transmission amplifier is controlled each time 64 pilot signals are received. In the stationary routine as well, the gain of the reception amplifier is controlled every time one pilot signal is received.

When the difference is larger than the predetermined value $\epsilon$ in decision blocks 106 and 111, the gain $G_r$ of the reception amplifier is adjusted in block 113 as in block 102. Thereafter, an operation similar to block 103 is performed in block 114. The adjusted gain value of the transmission amplifier is $G_{t3}$. Next, an abnormal adjusted value of the gain of the transmission amplifier is examined. When a collision of test signals occurs, the adjusted gain of the transmission amplifier obviously becomes abnormal.

Therefore, $|G_{t1}-G_{t3}|$ and $|G_{t2}-G_{t3}|$ are compared with $\epsilon$ in decision blocks 115 and 116. When $|G_{t1}-G_{t3}|>\epsilon$, it is determined that the second adjusted value $G_{t2}$ in the stationary routine is abnormal, so that the adjusted value $G_{t2}$ is ignored. In this case, $G_{t3}$ is set to the transmission amplifier (block 17) and thereafter the stationary routine starting from the block 108 is executed. When $|G_{t1}-G_{t3}|>\epsilon$ and $|G_{t2}-G_{t3}|>\epsilon$, it is decided that the second adjusted gain value $G_{t2}$ in the initialization routine is abnormal and $G_{t2}$ is ignored. When $|G_{t1}-G_{t3}|>\epsilon$ and $|G_{t2}-G_{t3}|>\epsilon$, the operations are repeated from block 102.

Due to the foregoing gain control operation, the time slots for transmission of test signals which are assigned to respective MAUs are distributed widely within a period of time (320 sec) which is 64 times one period (five seconds) of the pilot signal, so that the transmission of information signals from information processors is not influenced.

In the above-described embodiment, the random number generating means is separately provided. However, in place of this arrangement, random numbers may be generated in the gain controller, that is, in a microprocessor. In the above embodiment, the transmission path 3a and reception path 3b of the communication line 3 may be a physically identical medium. In this case, the headend device may be constituted by a frequency converting device. The reference signal generator may be coupled to any point on the communication line so long as each MAU can receive the reference signal. Particularly, when the reference signal generator is coupled to the extremity or its neighborhood of the transmission path it is possible to detect abnormality of amplifiers arranged on the communication line by monitoring the level of the pilot signal at the extremity or its neighborhood of the reception path.

What is claimed is:

1. A communication network comprising:
   a plurality of information processors;
   a communication medium;
   medium attachment units (MAU) for coupling said information processors to said communication medium;
   pilot signal transmitting means for sending a pilot signal, having a reference level, at a predetermined point of said communication medium so that said pilot signal may be received by each MAU;
   each MAU comprising a reception amplifier to receive a signal from said communication medium; a transmission amplifier to transmit a signal to said communication medium; reception level detecting means coupled to said reception amplifier for detecting a reception level of the signal received by said reception amplifier; test signal transmitting means for transmitting a test signal to said communication medium through said transmission amplifier; gain control means for controlling gains of said transmission and reception amplifiers in response to said reception level detecting means when said pilot signal and test signal are received by said reception amplifier, said gain control means being arranged to enable said test signal transmitting means to transmit said test signal to said communication medium through said transmission amplifier; and random number data generating means; and
   said gain control means being arranged to allow said test signal transmitting amplifier to said signal through said transmission amplifier to said communication medium in a time slot depending on random number data generated by said random number generating means after reception of the pilot signal and to adjust the gain of said transmission amplifier in accordance with the reception level of the test signal received by said reception amplifier in response to said reception level detecting means.

2. A communication network according to claim 1, wherein said gain control means is arranged to adjust the gain of said reception amplifier to a level suitable for receiving processing of signals in response to the reception level of the pilot signal.

3. A communication network according to claim 1, wherein said gain control means is arranged to execute an initialization routine and a stationary routine for adjusting the gain of said transmission amplifier, to allow said test signal transmitting means to transmit the test signal each time a pilot signal is received in the initialization routine and to allow said test signal transmitting means to transmit the test signal each time a plurality of pilot signals are received in the stationary routine.

4. A communication network according to claim 1, wherein said gain control means is arranged to execute an initialization routine and a stationary routine for adjusting the gain of said transmission amplifier, and in the initialization routine, said gain control means allows said test signal transmitting means to transmit test signals in time slots depending on first and second random number data each time the pilot signal is received; adjusts the gain of said transmission amplifier each time the test signal is received in accordance with the reception level of said test signal; and advances the gain control operation from the initialization routine to the stationary routine when the difference between the adjusted gains of said transmission amplifier lies within a predetermined allowable range, and in the stationary routine, said gain control means allows said test signal transmitting means to transmit a test signal in a time slot depending on fourth random number data after receiving a number of pilot signals depending on third random number data; adjusts the gain of said transmission amplifier in accordance with the reception level of said test signal; allows said test signal transmitting means to transmit a test signal in a time slot depending on said fourth random number data after receiving a predetermined number of pilot signals when the difference between the adjusted gain of said transmission amplifier and the first adjusted gain of said transmission amplifier in the initialization routine lies within the allowable range; and adjusts the gain of said transmission amplifier in accordance with the reception level of the test signal.

5. A communication network according to claim 1, wherein the test signal has a duration enough to perform the gain control operation of said transmission amplifier.

6. In a communication network comprising: a communication line having a transmission path and a reception path which are coupled at a predetermined point; a plurality of information processors; and a plurality of medium attachment units (MAUs) which couple corresponding information processors to said communication line at arbitrary points on said communication line, thereby allowing tranmission and reception of information signals among said information processors to be performed, each MAU including a transmission amplifier for transmitting an information signal from the corresponding information processor to said transmission path and a reception amplifier for receiving through said predetermined coupling point of said transmission and reception paths and said reception path information signals transmitted from said MAUs to said transmission path, a method for allowing each of said MAUs to receive information signals from said MAUs at a substantially equal level comprising the steps of:

transmitting a pilot signal having a reference level to a point of said communication line at a predetermined time interval so that each of said MAUs can receive the pilot signal;

controlling the gain of said reception amplifier to a level suitable for receiving processing each time the pilot signal is received after a power supply of the corresponding MAU is turned on;

generating data representative of random numbers in the corresponding MAU;

allowing the corresponding MAU to transmit a test signal to said communication line through said transmission amplifier in time slots in one period of the pilot signal depending on random number data after receiving the pilot signal; and adjusting the gain of said transmission amplifier of the corresponding MAU each time the test signal is received such that the reception level of the test signal becomes substantially equal to the reception level of the pilot signal.

7. A method according to claim 6 further comprising the step of:
selecting a pilot signal serving as a reference to set a time slot for transmitting the test signal in dependence on random number data.

* * * * *